United States Patent [19]

Fletcher

[11] Patent Number: 4,479,223
[45] Date of Patent: Oct. 23, 1984

[54] ADAPTATION FOR IMPROVING LIFETIME OF DYE LASER USING COUMARIN DYES

[75] Inventor: Aaron N. Fletcher, Ridgecrest, Calif.

[73] Assignee: The United States of America as represented by the Secretary of the Navy, Washington, D.C.

[21] Appl. No.: 404,178

[22] Filed: Aug. 2, 1982

[51] Int. Cl.$^3$ ................................................ H01S 3/20
[52] U.S. Cl. ....................................... 372/53; 372/54; 372/60
[58] Field of Search ....................... 372/53, 60, 51, 59, 372/54

[56] References Cited

U.S. PATENT DOCUMENTS

| Re. 28,298 | 1/1975 | Kolb et al. | 331/94.5 |
|---|---|---|---|
| 3,521,187 | 8/1970 | Snavely et al. | 331/94.5 |
| 3,745,483 | 8/1973 | Hochital et al. | 331/94.5 |
| 3,771,065 | 11/1973 | Goldberg et al. | 331/94.5 L |
| 3,891,569 | 6/1975 | Schimtschek et al. | 331/94.5 L |
| 3,927,033 | 12/1975 | Hammond | 331/94.5 L |
| 4,026,898 | 5/1977 | Henry et al. | 331/94.5 L |
| 4,103,256 | 7/1978 | Hammond et al. | 331/94.5 L |
| 4,178,565 | 12/1979 | Morton | 331/94.5 D |

OTHER PUBLICATIONS

Fletcher et al., "Effects of Chemical Substituents of Bicyclic Dyes Upon Photodegradation Parameters"; *App. Phys.* 16 pp. 289–295, 1978.

Calkins et al., "The Use of Caffeine as a Liquid Filter in Coaxial Flashlamp Pumped Dye Lasers"; *Opt. Comm* 42 No. 4, Jul. 82.

*Primary Examiner*—William L. Sikes
*Assistant Examiner*—Léon Scott, Jr.
*Attorney, Agent, or Firm*—Robert F. Beers; W. Thom Skeer

[57] ABSTRACT

The effective lasing lifetime of laser dyes including coumarin dyes are significantly extended by the use of an inert cover gas for the laser dye solution such as argon in combination with the employment of a glass filter such as Pyrex disposed between the pumping flash lamp and the dye laser cavity capable of absorbing electromagnetic radiation of about 300 nanometers or shorter wavelength.

8 Claims, No Drawings

ADAPTATION FOR IMPROVING LIFETIME OF DYE LASER USING COUMARIN DYES

BACKGROUND OF THE INVENTION

1. Field of the Invention

This invention relates to the field of electronics. More particularly, this invention relates to dye lasers. Still more particularly, but without limitation thereto, this invention relates to dye lasers having extended operating life.

2. Description of the Prior Art

The fact that complex organic dye molecule can be induced to emit coherent laser light is well known and is described in, for example, M. R. Kagan, G. I. Farmer, and B. G. Huth, "Organic Dye Lasers", *Laser Focus* 4, pp 26-33, September 1968, and P. Sorokin, "Organic Lasers", *Scientific American*, pp 30-40, February 1969. The active medium of a typical organic dye laser consists of a dilute solution of the organic material dissolved in a common solvent such as water or alcohol. However, it is not necessary to use liquid solvents with the organic molecules; solid matrices, such as polymethyl methacrylate can also be used. The term "dye" laser is derived from several classes of organic dye compounds in which lasing has been produced. Actually, a great number of compounds useful in dye lasers do not fit the general classification of organic dyes.

A major advantage of the organic dye laser is its tunability, that is, the output of an individual laser can be changed continuously over a range of wavelengths. This feature makes the dye laser particularly suitable for use in isotope separation processes based on selective photoexcitation of a particular isotopic species. A general description of laser isotope separation processes is given in C. Bradley Moore, "The Application of Lasers to Isotope Separation", *Accounts of Chemical Research* 6, pp 323-328, 1973. The narrow bandwidth and exact wavelength requirements of the excitation source generally require that a finely tunable laser be used.

Efficient lasers which operate in the blue to near ultraviolet region, particularly in the 350-400 nm region, are desirable for specific applications, particularly for specific isotope separation processes such as uranium isotope separation. At present, the most efficient laser dyes known with respect to low threshold, high slope efficiency, long-pulse, and continuous-wave (CW) operation are contained within the classes of the xanthenes, oxazines, carbazines, carbopyronins, and coumarins. The most blue-shifted of these reported to date is 7-amino-4-methyl-coumarin (Eastman Kodak dye coumarin 120) which lases at 440 nm in methanol.

A major drawback of the prior art dye laser employing coumarin dyes as well as other dyes has been the failure of the dye solution to continue lasing after a short period of time due to degradation of the dye solution. In order to lengthen the effective lasing lifetime of the coumarin dyes various techniques have been attempted in the prior art, such as employing an inert cover gas such as argon in the dye reservoir instead of air. It was found, however, that this technique resulted in a more rapid degradation of the dye lasing capacity than when air was used, as seen in A. N. Fletcher and D. E. Bliss, "Effect of Chemical Substituents of Bicyclic Dyes Upon Photodegradation Parameters" *Applied Physics* 16, pp. 289-295, 1978, at p. 295.

SUMMARY OF THE INVENTION

An object of the present invention is to provide a method of operating a dye laser system employing coumarin dyes.

A further object of the present invention is to provide a method of operating a dye laser system employing coumarin dyes where effective lifetimes of coumarin dyes as a lasing medium are substantially extended over prior art techniques.

These and other objects have been demonstrated by the present invention wherein the coumarin dye reservoir employs an argon cover gas and the excitation light from the flash lamp is filtered through an inactive filter such as Pyrex before reaching the coumarin dye in the laser cavity. Significantly longer effective dye solution lifetimes have been observed employing this technique.

DESCRIPTION OF THE PREFERRED EMBODIMENT

The invention is further illustrated by the following example which includes preferred embodiments thereof.

EXAMPLE

Coumarin 1 with ethanol was tested to determine lifetime as a laser dye, first with air as a cover gas, then with argon as a cover gas, and finally with argon as a cover gas using a Pyrex filter employing the following equipment and procedure:

The laser cavity was 29 cm long and consisted of a 3 or 4 m radius mirror of 99.7% reflectivity and, an approximately 60% reflectivity output mirror. Phase-R DL-5 xenon coaxial flashlamp has been used. It is driven by a 0.16 $\mu$F capacitor and has a risetime of the order of 350 to 380 ns (10% to 90%). Noncoated polished quartz windows aligned perpendicular to the optical axes were used on the dye cell. This particular alignment is not optimal for lasting output but it is reproducible. Lasing output was held to about 30 mJ per pulse in order to minimize damage to the optical components. Even with this restriction, antireflection coatings initially used on the windows were quickly damaged. Consequently, in order to obtain more reproducible results, uncoated windows were used. 200 proof ethanol was used as received. When commercially available, laser grade dyes were usually used.

Dye solutions were prepared so that the absorbance of the peak of the lowest energy band had a value of either 4 cm$^{-1}$ or 2 cm$^{-1}$. For 300 ml of dye solution, a 90 mm diameter b 0.5 $\mu$m pore size Fluoropore filter (Millipore Corp.) was used; for 150 ml of solution, a 25 mm diameter 2 $\mu$m pore size Polyvicfilter was used. Flow rate was 8 mls$^{-1}$ for the dye solution at 25° C. The dye solution was circulated at least one half hour in the system prior to the first flash. Test measurements were made at one flash every 24 s, the "near zero" flash frequency for our system. Five measurements in sequence were taken and averaged for each specific input energy. Input energies were selected 5J apart. Different input energies were tested in a random order. Additional flashes needed to degrade the dye were made at one flash every five seconds using a nominal input of 30J. This level of input energy was selected so as to minimize degradation to the flashlamp. The Phase-R DL-5 flashlamp is rated at 75J, but we have never flashed the one used in this study at higher than 50J input. The output characteristics of the flashlamp were monitored periodically throughout the course of the test of each dye. The low flash frequency necessitated runs being made over more than one day for some of the more stable dyes. The dye solutions were degraded so that output had decreased to less than half of the initial value for most of the values of input energy.

An expression of dye laser lifetime has been developed to determine how long a specific dye solution will last until the laser output has dropped by some specific fraction. For a drop to half the original output the lifetime expression is $$T = \frac{(I - t_o)}{(I + t_o)} \times \frac{I}{C}$$

where
T = total flash lamp input energy (electrical) per unit volume, $\Sigma I$/liter in Joules/liter
I = electrical input energy per excitation flash in Joules
$t_o$ = initial threshold input energy in Joules
1/C = lifetime constant Joules/liter The lifetime constant 1/C can thus be experimentally determined. A figure of merit defining actual effectiveness of the dye laser can be determined by multiplying the lifetime constant 1/C by the initial slope efficiency $k_o$ which represents the ratio of dye laser output energy to excitation flash input energy less the threshold.

For coumarin 1 in solution with ethanol having air as a cover gas the lifetime constant 1/C was 0.14 MJ/liter and the figure of merit was 0.33 KJ/liter.

Coumarin 1 in solution with ethanol using both a pyrex filter and argon as a cover gas according to the present invention demonstrated lifetime constant 1/C of 52.0 MJ/liter and a figure of merit of 42.0 KJ/liter thus demonstrating significant lifetime improvements over the unprotected dye solution.

Previous tests performed with Coumarin 1 with ethanol were air and argon were compared as a cover gas resulted in about a 30 percent longer effective laser dye lifetime using air as the cover gas as compared to argon. Numerical data of these tests are not presented as they are not directly comparable to the above presented data.

The above test illustrates the advantage of the Pyrex filter in protecting the coumarin dye solution from photolysis resulting in degradation of lasing capability. Although the inventors should not be held to any particular theory, it is thought that photolized ethanol of the laser dye solution can react with either the dye or oxygen present from air. If the photolyzed ethanol reacts with oxygen, the dye is "protected", explaining the improved lifetime of the dye solution when air is employed as the cover gas as compared with no oxygen present. However, if the ethanol is protected from photolysis by the blocking out of wavelengths of light, by means of the Pyrex filters that are readily absorbed by the ethanol, then the oxygen is no longer needed to "protect" the dye from photolyzed ethanol. It is then possible to operate the dye laser in the absence of oxygen. This is desirable since oxygen is known to attack the dye when photolyzed. The lasing lifetime has, thus, been found to be significantly extended by employing argon as an inert cover gas and a Pyrex light filter.

Other coumarin dyes tested using a Pyrex filter and inert gas as a cover gas according to the present invention displayed good stability. Results of tests of several coumarin dyes are shown in Table 1.

TABLE 1

| | Lifetime Constant 1/C MJ/liter | | Figure of Merit $k_o$/C KJ/liter | | |
|---|---|---|---|---|---|
| | Unprotected | Protected | Unprotected | Protected | Filter Only |
| Coumarin 102 | 0.23 | 5.8 | 0.53 | 8 | 1.1 |
| LD-490 | .32 | 19.0 | 0.73 | 40 | 7.5 |
| AC3F | 0.82 | 230 | 1.3 | 320 | 59. |
| C8F | 0.29 | 140 | 0.35 | 170 | 120 |

As can be seen, coumarin dye solutions protected with a Pyrex filter and an argon cover gas demonstrate substantially improved lifetimes over coumarin dye solutions under air (unprotected) and can be better than those values found when air is used with a Pyrex filter.

Although the present invention is particularly useful in the extension of effective lifetimes of coumarin type dyes, it is also useful with other laser dye compounds. The structures of the dyes tested above, including Coumarin 1, LD-490, AC3F, C8F, and Coumarin 102 are shown below.

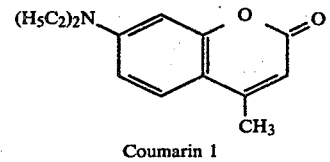

Coumarin 1

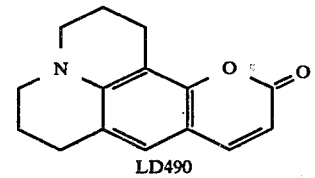

LD490

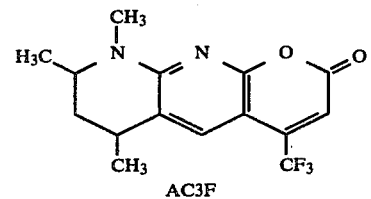

AC3F

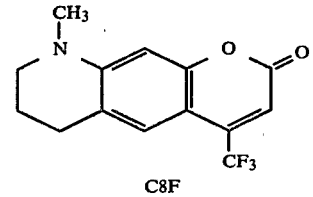

C8F

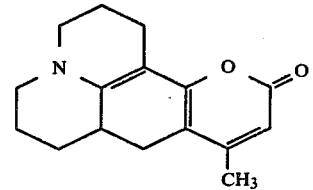

Coumarin 102

The excitation light (radiation) filter preferred is one capable of absorbing or deflecting light with wavelengths of about 300 nanometers or shorter and is preferable composed of glass, most preferably Pyrex glass. Although other thicknesses may be employed, the preferred thickness for the Pyrex filter is about one millimeter.

In summary, stability, or half life of coumarin laser dyes have been significantly extended by the employment of both an inactive filter such as Pyrex and argon as a cover gas. This combination has demonstrated unexpected results, particularly in the case of Coumarin 1 dye where the employment of the combination technique of the invention resulted in improved dye stability over unfiltered operation under air and where laser operation under argon alone significantly decreased dye stability.

What is claimed is:

1. In the method of operation of a flash lamp pumped dye laser, having a dye reservoir containing a coumarin dye, the improvement comprising the steps of:
    providing an inert cover gas for said coumarin dye reservoir; and
    filtering excitation light from said flash lamp to prevent electromagnetic radiation of 300 nanometers or shorter wavelength from being transmitted to said dye laser whereby the method of operation results in superior effective coumarin dye lifetimes.

2. The improvement of claim 1 wherein said coumarin dye is selected from the group consisting of Coumarin 1, Coumarin 102, LD490, AC3F and C8F.

3. In the method of operation of a flash lamp pumped dye laser, having a dye reservoir containing a coumarin dye, the improvement comprising the steps of:
    providing an inert cover gas comprising argon for said coumarin dye reservoir; and
    filtering excitation light from said flash lamp to prevent electromagnetic radiation of 300 nanometers or shorter wavelength from being transmitted to said dye laser whereby the method of operation results in superior effective coumarin dye lifetimes.

4. The improvement of claim 3 wherein said filtering step is accomplished by employing a glass filter for absorbing said radiation waves of 300 nanometers or shorter, said filter being located between said flash lamp and said dye laser.

5. The improvement of claim 4 wherein said glass filter is composed of Pyrex glass.

6. The improvement of claim 5 wherein said coumarin dye is selected from the group consisting of Coumarin 1, Coumarin 102, LD490, AC3F and C8F.

7. The improvement of claim 4 wherein said coumarin dye is selected from the group consisting of Coumarin 1, Coumarin 102, LD490, AC3F and C8F.

8. The improvement of claim 3 wherein said coumarin dye is selected from the group consisting of Coumarin 1, Coumarin 102, LD490, AC3F and C8F.

* * * * *